United States Patent
Saurin

(10) Patent No.: US 10,252,362 B2
(45) Date of Patent: Apr. 9, 2019

(54) METHOD, SYSTEM AND APPARATUS FOR MACHINING GEARWHEELS

(71) Applicant: BRETON SPA, Castello di Godego (IT)

(72) Inventor: Claudio Saurin, Rubano (IT)

(73) Assignee: BRETON SPA, Castello di Godego (TV) (IT)

( * ) Notice: Subject to any disclaimer, the term of this patent is extended or adjusted under 35 U.S.C. 154(b) by 848 days.

(21) Appl. No.: 14/411,187

(22) PCT Filed: Jun. 14, 2013

(86) PCT No.: PCT/IB2013/054872
§ 371 (c)(1),
(2) Date: Dec. 24, 2014

(87) PCT Pub. No.: WO2014/001941
PCT Pub. Date: Jan. 3, 2014

(65) Prior Publication Data
US 2015/0290731 A1      Oct. 15, 2015

(30) Foreign Application Priority Data
Jun. 25, 2012   (IT) .............................. TV2012A0122

(51) Int. Cl.
*B23F 17/00*     (2006.01)
*B23F 23/12*     (2006.01)
*G05B 19/19*     (2006.01)

(52) U.S. Cl.
CPC .............. *B23F 23/12* (2013.01); *B23F 17/00* (2013.01); *G05B 19/19* (2013.01)

(58) Field of Classification Search
CPC ....................................................... B23F 23/12
USPC ......................................................... 700/160
See application file for complete search history.

(56) References Cited

U.S. PATENT DOCUMENTS

| 4,866,835 | A |   | 9/1989  | Novak |   |
|-----------|---|---|---------|-------|---|
| 5,136,522 | A |   | 8/1992  | Loehrke |   |
| 5,255,475 | A | * | 10/1993 | Kotthaus | B23F 17/001 451/548 |
| 5,257,199 | A | * | 10/1993 | Tsujino | G05B 19/128 235/375 |

(Continued)

FOREIGN PATENT DOCUMENTS

| DE | 102005054513 A1 | 5/2007 |
| EP | 2314404 A1      | 4/2011 |

OTHER PUBLICATIONS

Boehme et al., May 31, 2007, English translation of German Patent Application Publication DE 102005054513 A1, Retrieved online on Sep. 15, 2017 from <patents.google.com/patent/DE102005054513A1/en>.*

(Continued)

*Primary Examiner* — James D. Rutten
(74) *Attorney, Agent, or Firm* — Fredrikson & Byron, P.A.

(57) ABSTRACT

A method for machining a gearwheel by means of stock removal using a numerical-control machine tool with at least five machining axes. Also described are an apparatus for producing commands and a machining system which comprises a machine tool with at least five axes, data input means and calculation and processing and command units.

22 Claims, 2 Drawing Sheets

(56) References Cited

U.S. PATENT DOCUMENTS

| | | | | |
|---|---|---|---|---|
| 6,088,627 | A * | 7/2000 | Wildenberg | B23Q 1/5462 |
| | | | | 700/160 |
| 6,269,284 | B1 * | 7/2001 | Lau | G05B 19/404 |
| | | | | 700/160 |
| 8,307,551 | B2 * | 11/2012 | Kotthoff | 5/22 |
| 2007/0185607 | A1 * | 8/2007 | Kamiya | G05B 19/4093 |
| | | | | 700/180 |
| 2011/0268524 | A1 | 11/2011 | Prock et al. | |
| 2012/0208436 | A1 * | 8/2012 | Muller | B23F 19/00 |
| | | | | 451/5 |

OTHER PUBLICATIONS

PCT International Search Report and Written Opinion dated Nov. 8, 2013 for Intl. App. No. PCT/IB2013/054872, from which the instant application is based, 11 pgs.

"5-Achsen-Fräsen ersetzt klassiches Verzahnen," Technische Rundschau, Hallwag AG, CH, vol. 102, No. 4, Apr. 16, 2010, pp. 63-66.

* cited by examiner

METHOD, SYSTEM AND APPARATUS FOR MACHINING GEARWHEELS

RELATED APPLICATIONS

This application is a 35 U.S.C. 371 national stage filing from International Application No. PCT/IB2013/054872, filed Jun. 14, 2013, and claims priority to Italian Application No. TV2012A000122, filed Jun. 25, 2012, the teachings of which are incorporated herein by reference.

FIELD OF THE INVENTION

The present invention relates to a method, an apparatus and a system for machining a gearwheel by means of a numerical-control milling machine, in particular a milling machine with at least five controlled axes.

BACKGROUND

In the technical sector relating to the manufacture of gearwheels, the "classic" method of cutting the teeth of gearwheels envisages using special tools mounted on dedicated machines, called gear-cutting machines. Usually the gear-cutting machines perform a first—so-called prefinishing—operation, for cutting the teeth of the gearwheel, and a second—so-called finishing—operation. Between the first and second operation usually a procedure for heat treatment of the gearwheel is performed.

When using a gear-cutting machine, the prefinishing is performed using a shaped tool, usually called a roughing hob which cuts the teeth from the blank by rotating the gearwheel on the hob (which is in turn rotationally synchronized), while the finishing operation is performed using another shaped tool, usually called a finishing hob, which performs a finishing operation on the final profile so as to form the final profile of the gearwheel with the desired surface finish. The difference in radial penetration between the roughing tool and the finishing tool is usually limited to about a few tenths of a millimeter, apart from the bottom of the tooth, where the finishing operation preferably does not remove any material. This ensures a greater strength of the finished gearwheel and prevents frictional contact between the tip of the hob tooth and the bottom of the tooth space, thereby reducing greatly the stress and wear on the end edges of the hob teeth. This ultimately improves the precision and quality of the finished surface of the gearwheel.

US 2011/268524 for example describes the use of milling cutters shaped with the exact profile of the space to be obtained between two adjacent teeth, with the roughing cutter which reaches as far as the bottom of the space which is to be obtained between the teeth and the finishing cutter which has a smaller diameter so as not to touch the bottom which has already been machined.

U.S. Pat. No. 5,136,522 describes a machine which cuts a gearwheel by means of a single milling cutter specially shaped according to the space to be obtained between the teeth. A sensor is able to sense the space between the teeth and generate a correction signal.

Obviously, with the classic method mentioned above it is necessary to provide a number of gear-cutting tools corresponding to the number of profiles of the racks which are used to generate the geometric profiles of the gearwheels which are to be made.

The system is very efficient in the case of production on a large scale and the market for these systems is far-reaching, there existing various computerized programs for designing the gears, which perform calculation of the machining curves followed by the pair of gear-cutting tools, as well as, for example, simulation of the gearwheel so that its characteristics may be precisely defined before actual manufacture.

For the production of gears on a small scale or in very small numbers, the realization thereof by means of dedicated cutting tools is however excessively costly. In such cases, therefore, for some time it has been proposed cutting the gearwheel by means of numerical-control machine tools which are advantageously of the 5-axis type. According to the customary procedure, in the case of these machines a mathematical representation of the surface which is to be obtained is created and the machine follows this surface with its own cutting tools, thus forming the desired part.

When manufacturing gearwheels, however, the advantages of having a large number of programs for designing gearwheels by means of gear-cutting machines, already used for some time and well-known to gearwheel manufacturers who use the "classic" method, are lost.

DE 10 2005 05054513 describes a gearwheel formed by means of machining a continuous rough-formed surface and a continuous finishing surface. The dimensions, described in this patent application, of the continuous finishing surface compared to the continuous rough-formed surface are said to improve meshing of the gears. The problem, however, of how to optimize machining of the two surfaces calculated is not considered in any way.

EP 2,314,404 describes a method for moving a tool along parallel lines in order to obtain finishing of single surfaces of a gear which has already been cut.

BRIEF SUMMARY OF EMBODIMENTS OF THE INVENTION

The general object of the present invention is to provide a method, an apparatus and a system for machining gearwheels using a machine tool with at least five axes based on definition of surfaces generated by a prefinishing rack and a finishing rack.

In view of this object the idea which has occurred is to provide, according to the invention, a method for machining a gearwheel by means of stock removal using a numerical-control machine tool with at least five machining axes, comprising the steps of defining theoretical prefinishing surfaces and theoretical finishing surfaces of the gearwheel; calculating a line of intersection between the theoretical prefinishing surface and finishing surface; using as a real prefinishing surface the theoretical prefinishing surface and as a real finishing surface for each tooth the part of the theoretical finishing situated between the tip of the tooth and the said intersection line; operating the machine so as to perform a first gearwheel machining operation where tools of the machine follow machining surfaces so as to form the said real prefinishing surface and then operating the machine so as to perform a second gearwheel machining operation where tools of the machine follow machining surfaces so as to form the said real finishing surface.

Still according to the invention, the idea which has occurred is to provide a system for machining a gearwheel by means of stock removal using a numerical-control machine tool with at least five machining axes, characterized in that it comprises: a numerical-control machine tool with at least five axes; means for entering parameters of a desired gearwheel, a calculation module for calculating theoretical prefinishing surfaces and theoretical finishing surfaces of the gearwheel; a processing module for calculating a line of intersection between these theoretical surfaces and the definition of at least one real finishing surface for each tooth formed by the part of the theoretical refinishing surface situated between the tip of the tooth and the said intersection line; a control module which receives the geometric characteristics of the said theoretical prefinishing surface as real prefinishing surface and the geometric characteristics of the said real finishing surface and outputs commands for the machine such that tools of the machine follow machining surfaces so as to perform machining of the gearwheel according to these real prefinishing and finishing surfaces.

Still according to the invention, the idea which has occurred is that of providing an apparatus for producing commands for machining a gearwheel, intended for a numerical-control machine tool with at least five machining axes, characterized in that it comprises: means for entering parameters of a desired gearwheel, a calculation module for calculating theoretical prefinishing surfaces and theoretical finishing surfaces of the gearwheel; a processing module for calculating a line of intersection between these theoretical surfaces and the definition of at least one real finishing surface for each tooth formed by the theoretical finishing surface part situated between the tip of the tooth and the said intersection line; a control module which receives the geometric characteristics of the said theoretical prefinishing surface as real prefinishing surface and the geometric characteristics of the said real finishing surfaces and outputs commands which are intended for a machine in which tools of the machine follow machining surfaces on the basis of these command so as to perform machining of the gearwheel according to these real prefinishing and finishing surfaces.

BRIEF DESCRIPTIONS OF DRAWINGS

In order to illustrate more clearly the innovative principles of the present invention and its advantages compared to the prior art, an example of embodiment applying these principles will be described below, with the aid of the accompanying drawings. In the drawings.

DETAILED DESCRIPTION OF EMBODIMENTS OF THE INVENTION

Figure 1:
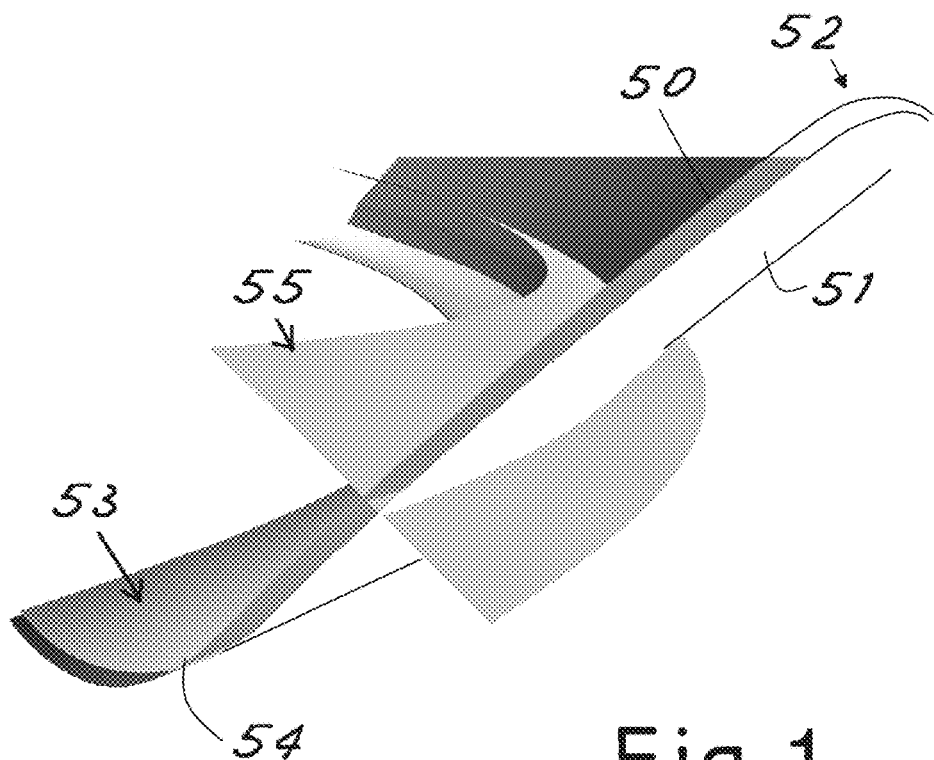
FIG. 1 shows a partial schematic view of intersection between the theoretical finishing and prefinishing surfaces of a gearwheel.

With reference to the figures, FIG. 1 shows parts of theoretical surfaces used according to the present invention to define the surfaces to be machined on a gearwheel by means of an at least five-axis numerical-control machine tool. FIG. 1 shows for the sake of simplicity the surfaces in the vicinity of the flank of a tooth of the gearwheel.

In particular, according to the method, firstly a theoretical prefinishing surface 50 and theoretical finishing surface 51 which would be generated by a theoretical prefinishing gear-cutting machine and by a theoretical finishing gear-cutting machine are calculated.

As can be clearly seen in FIG. 1 the theoretical finishing surface 51 will be underneath the theoretical prefinishing surface 50 along the parts of the tooth where the finishing operation must remove further material (in particular from the tip 52 of the tooth and along the flank up to close to the bottom) and will instead be above the theoretical prefinishing surface on the bottom 53 of the teeth, where stock removal is not required during the finishing step.

The theoretical finishing surface for each flank of the tooth is in general formed by a convex part towards the tip of the tooth, which is joined to a concave part at the tooth base.

As will be clarified below, the description of the theoretical prefinishing surface is used as a description of the first surface (or prefinishing surface) to be machined, such that the machine may form this surface directly in the part. In view of the geometry of the surface, generally the machine will also calculate the tool changing operation, for example depending on whether the machining zone is concave or convex. In particular, known cylindrical or conical or disc-shaped milling cutters of suitable diameter will be advantageously used to hollow out and prefinish the flank of the teeth and a known spherical or toroidal milling cutter of suitable diameter will be used for the bottom zone (as shown for example schematically in FIG. 1).

Different tools may be used depending on the particular type of gearwheel being machined. For example, in the case of bevel gearwheels, the disc-shaped cutters may be advantageously conical disc-shaped milling cutters.

As can be seen from the figures and the description which follows, the tools of the machine are moved so as to follow machining surfaces such as to form the said real prefinishing surface.

According to the method, the contact points of the theoretical finishing surface and the theoretical prefinishing surface on the flank of the teeth, where the two surfaces cross each other, are also calculated. A line 54 of intersection of the two theoretical surfaces, i.e. prefinishing surface 50 and finishing surface 51, on each tooth is thus defined. The section of theoretical finishing surface situated between the tip 52 of the gearwheel tooth and the calculated intersection line 54 is defined as real finishing surface.

The description of the real finishing surface is used for finish-machining by the machine, such that the machine may finish the previously cut gearwheel with the prefinishing surface, forming thereon the surfaces corresponding to the real finishing surface defined above.

As can be seen from the figures and the description which follows, the tools of the machine are moved so as to follow machining surfaces such as to form the said real prefinishing surfaces for each tooth.

Advantageously, between machining of the real prefinishing surface and machining of the real finishing surface, the gearwheel is subjected to a known desired heat treatment. Such heat treatment is advantageously a surface hardening heat treatment, such as a carburizing treatment. Still in accordance with the method of the invention, once the line 54 of intersection between the two theoretical prefinishing and finishing surfaces has been calculated, a verification step may also be performed to check that this line lies at a distance from the axis of the gearwheel which is smaller than the active radius of the gearwheel (namely, the radius of initial meshing of the gearwheel with another gearwheel).

In this way it is checked that the tooth part situated beyond the intersection line 54 towards the bottom 53 of the tooth does not require finish-machining. Otherwise, there would be an error in calculation of the theoretical surfaces 50 and 51, for example caused by incorrect parameters entered during design of the gearwheel.

The method may also comprise a further checking step where it is checked that the line of intersection 54 between the theoretical surfaces is contained within the volume defined by the "active" surface of revolution (called active cone, denoted schematically by 55 in FIG. 1) generated on the basis of the "active diameters" such as the geometrical locus of the initial meshing contact points.

Advantageously, the real finishing surface is divided up, on each tooth flank, into a first convex part extending from the tip diameter of the tooth as far as its active diameter and a concave/convex surface extending from the active diameter as far as said line of intersection calculated previously. Advantageously, the first part of the real finishing surface will be machined by means of a known cylindrical milling cutter (as shown for example schematically in FIG. 2) or conical milling cutter of suitable diameter, while the second part of the real surface will be machined using a known spherical or toroidal milling cutter of suitable diameter.

Owing to use of the theoretical finishing or prefinishing surfaces of theoretical racks used to define the real machining surfaces, at the end of machining of the gearwheel any residual sharp edge on the line of intersection generally already lies within an acceptability threshold for the finished gearwheel.

Figure 2:
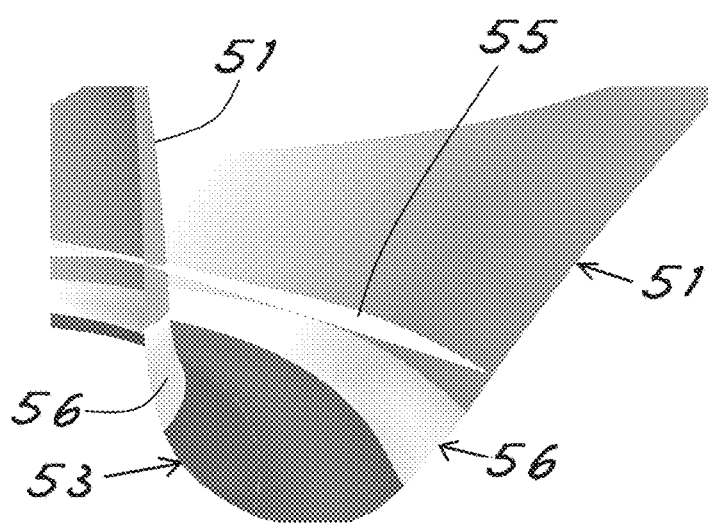
FIG. 2 shows a partial schematic view of a final surface of a gearwheel obtained from the surfaces according to FIG. 1.

In any case, although here, for the sake of simplicity, a line of intersection is referred to, this line (as can be seen in FIG. 2 where, for greater clarity, the flanks of two adjacent teeth of the finished gearwheel are partially shown, as shown by way of example in FIG. 4), may also be expanded on the flank of the tooth so as to become a continuous strip 56 joining together the two parts of the theoretical surfaces 51 and 50 which form overall the final real surface of the teeth of the gearwheel after the finishing step. In other words, the line of intersection is essentially expanded into a strip 56 joining together the real prefinishing surface on the bottom of the tooth and the real finishing surface on the flank of the tooth.

Figure 4:
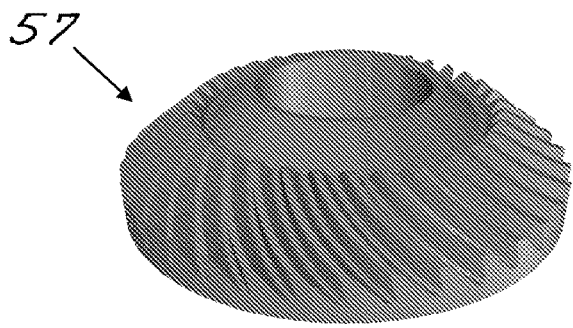
FIG. 4 shows a schematic view of a gearwheel obtained with the method and the system according to the invention.

Obviously, although in FIG. 4 a bevel gearwheel (denoted generically by 57) with helical teeth is shown as example, the method and the system according to the invention may produce gearwheels of any desired type.

Figure 3:
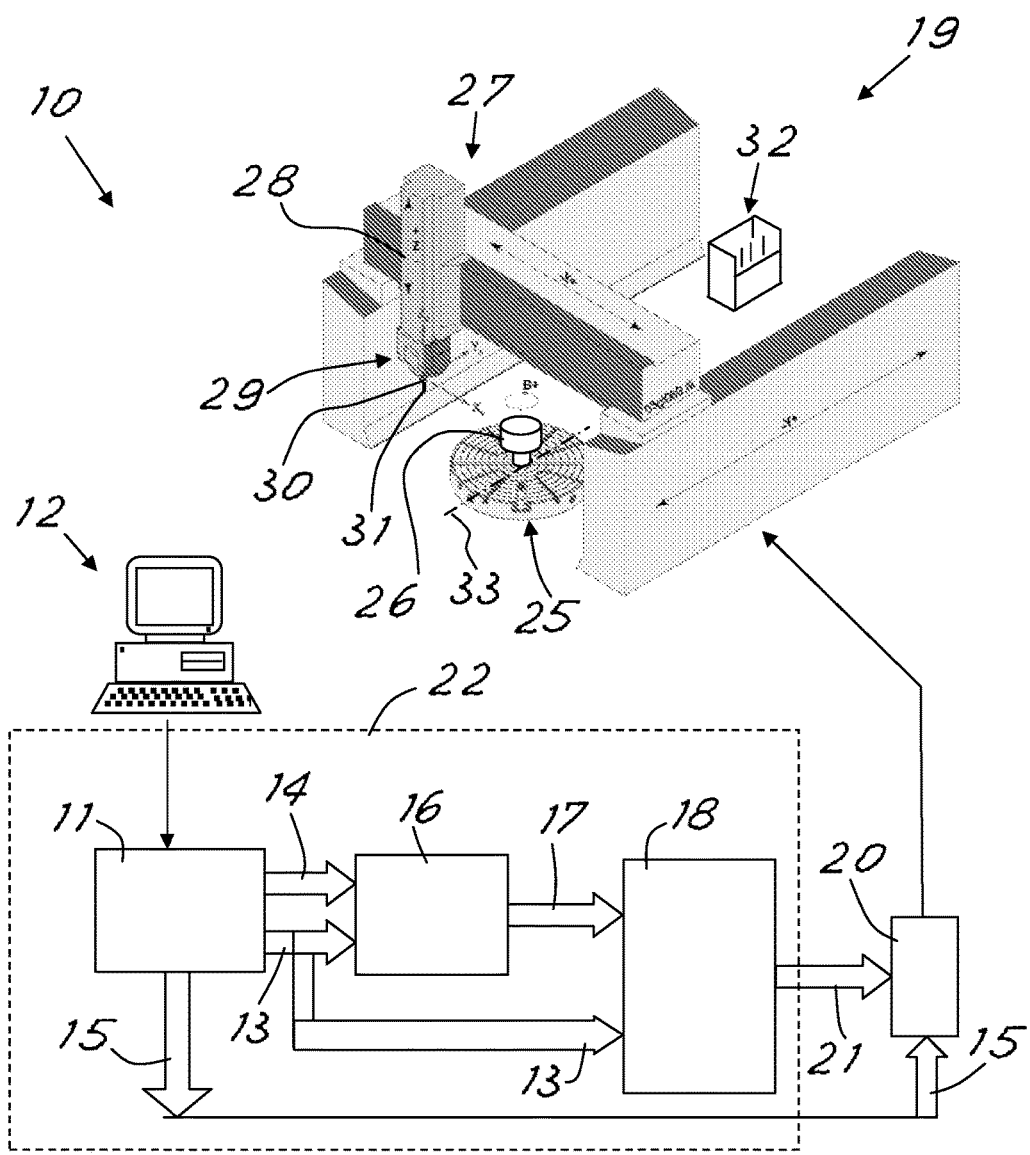
FIG. 3 shows a schematic view of a system according to the invention for designing and machining a gearwheel.

FIG. 3 shows schematically an apparatus 22 which, together with a machine 27, forms a machining system or station 10 designed according to the invention. The apparatus 22 comprises a first computerized calculation module 11 for calculating the theoretical prefinishing and finishing surfaces based on gearwheel definition parameters or gearwheel design data. The design parameters or data may be, for example, the dimensional specifications of the desired gearwheel which are entered directly or supplied based on standard gearwheel definition systems. Known databases and known user interface means (keyboard, mouse, display, graphical tablet, etc.) denoted overall generically by 12 may be used for entering the information. The module 11 may also comprise advantageously an interactive design system with simulation of the characteristics of the gearwheel. Such a system per se forms essentially part of the prior art and therefore will not be described or shown further, being able to be easily imagined by the person skilled in the art on the basis of the description provided here. This system, in combination with the user interface means 12, allows the user to define the desired gearwheel.

The module 11 outputs the geometric characteristics 13 and 14 of the theoretical prefinishing surface 50 and finishing surface 51, as defined above. Here, geometric characteristics are understood as meaning the set of information which defines the surfaces spatially. In particular, the surfaces will generally be described by means of their mathematical formula and/or points, according to known methods used in CAD/CAM systems for the spatial definition of the surfaces.

On the basis of the calculated theoretical surfaces, the module 11 may also output grid coordinates 15 of measurement points for the two surfaces, which will be used (depending on operating methods known per se) by measurement means of the numerical-control milling machine with at least 5 axes for checking on the machine the machining performed and for checking the geometry of the gearwheel on the machine after the heat treatment prior to finish-machining. This geometric check also allows the finish-machining operations to be related to the surface deformed by the heat treatment such as to ensure a greater uniformity of the actual stock.

In other words, the machine measurement using the grid of measurement points after initial machining (and advantageously after heat treatment) and before finishing allows centring of the machining operations performed on the deformed part, so as to ensure that the stock actually removed is advantageously uniform.

The module 11 may also output for various uses other information relating to the gearwheel design and useful for the user, such as the number of gear teeth, number of crown teeth, modulus, spiral angle or helical angle, gearwheel type (bevel, cylindrical, etc.), the active diameters at various tooth cross-sections, etc. This information may be transferred to the following modules and/or displayed or printed, for example, via the interface means 12.

The geometric characteristics 13 and 14 of the theoretical surfaces are transferred from the module 11 to the input of a second module 16 for processing the theoretical surfaces for calculation of the intersections of these theoretical surfaces, so as to obtain the geometric characteristics 17 of the intersection lines and the real finishing surfaces as described above.

These geometric characteristics 17 are sent, together with the geometric characteristics 13 of the prefinishing surface (used as a definition of the real prefinishing surface), to a CAM module 18 for controlling a numerical-control machine 19 with at least 5 axes, of the type known per se and with dimensions depending on the type (size, material hardness, precision, etc.) of the gearwheels which are to be made using this system. The machine receives the commands 21 (advantageously via a known interpolation and machine control module 20) and performs movement of the tool so as to follow with it the real machining surfaces.

The CAM module 18 communicates to the machine also the data for selecting the suitable tools for the various machining zones. The selection may be completely automatic or be performed offering a choice to the user (for example providing a list of tools from which the user may choose). Advantageously, the user may also choose cutting and feeding parameters depending, for example, on the material used for the gearwheel. The system may help the user with the choice by providing a list of possibilities obtained depending, for example, on the geometric characteristics of the surface to be machined.

Once the CAM module has processed the necessary settings, the machine 19 is started so as to perform the prefinishing machining according to the geometric characteristics and the parameters preset for said machining (for example, changing the milling cutters depending on the zones machined, as described above).

Once prefinishing machining has been completed, the CAM module may operate the machine 19 so as to carry out a verification measurement of the machined surfaces, using the grid 15 of prefinishing measurement points.

After any heat treatment (which involves disassembly of the gearwheel and subsequent reassembly on the machine), the CAM module 18 operates the machine 19 (again via the control module 20) so that the tools follow the machining surfaces such as to machine the gearwheel according to the real finishing surfaces defined by the geometric characteristics 17, such that the tool or tools may pass in an optimal manner from one surface to another in accordance with the—per se known—internal routines for tool movement between machining zones (routines advantageously contained in the interpolation and control module 20 of the machine).

It should be noted that, owing to the principles of the invention, calculation of the surfaces to be machined may be optimized so as to obtain the theoretical surfaces which would be produced by normal gear-cutting machines and which are easy to process using techniques which are now well-established and useful also for interactive design with simulation of the gearwheels. At the same time, owing again to the principles of the invention, the numerical-control machine does not waste time travelling with its tools along theoretical surfaces which do not correspond to any material machining (as occurs for example along the theoretical finishing surface situated close to the bottom of the tooth). In these zones, the machine may freely use the—per se known—optimized methods of tool movement so as to pass from one real machining surface to another surface, without unnecessary lost time.

At the same time, by using the theoretical surfaces to calculate the real machining surfaces it is possible to obtain a finished surface on the flanks of the tooth which is suitably joined to the surface of the bottom of the tooth, without the need to carry out further finishing of this surface on the tooth bottom after, for example, the heat treatment. This has been found to improve the quality of the gearwheel obtained.

The modules 11, 16 and 18 may be easily formed by means of one of one or more suitably programmed microprocessor systems, as can be easily imagined by the person skilled in the art on the basis of the description provided here. Such microprocessor systems may for example comprise advantageously a personal computer for realizing the means 12 and the modules 11, 16 and 18 and an industrial microcontroller control system for realizing the module 20 (generally mounted on the machine). In this way, the apparatus 22 may also be used separately from the machine, in order to produce commands which can be memorized for future use, for example using a separate machine tool. The apparatus 22 may also comprise or be incorporated in the means 12, forming for example a single personal computer which produces the commands 21 and optionally 15.

As may now be easily imagined by the person skilled in the art, the machine tool with at least five axes may have one of various structures which are known per se for this type of machine, also depending on the dimensions and characteristics of the gearwheels which are to be made.

For example, as can be seen in FIG. 3, it may advantageously comprise a rotating table 25 carrying the workpiece 26 and a gantry-like structure 27 for motor-driven displacement of a carriage 28 along three Cartesian axes. The carriage 28 carries a motor-driven head 30 which can be oriented about a first axis (generally substantially vertical) and can be inclined around a second axis transverse (perpendicular or inclined) with respect to the first axis and carrying a chuck 30, such as to form a five-axis positioning system for the tools 31 which may be removed by the head 30 directly from a known automatic tool store 32.

Alternatively, as shown schematically again in FIG. 3, the machine may have a table 25 able to perform not only controlled rotation, but also having at least one motor-driven inclination (advantageously diametral) axis 33, so as to form a rotary-tilting table. The motorized head 30 may thus not have a transverse inclination axis and have only an axis (vertical in FIG. 3) for rotation of the tool, since the inclination axes of the five-axis system are in this case transferred to the table 25.

At this point it is clear how the predefined objects have been achieved.

Obviously, the above description of an embodiment applying the innovative principles of the present invention is provided by way of example of these innovative principles and must therefore not be regarded as limiting the scope of the rights claimed herein. For example, the transfer of data between the various modules may be performed by means of data transmission connections and/or data transfer interfaces between modules of the same program, depending on the practical embodiment of the modules. Transfer of the data may also be performed by saving the data on a physical medium which can be written by one module and read by the next module. For example, the CAM module 18 may save files on a suitable medium which is then read by the machine control module 20.

This means that it is possible, for example, to have (depending on the specific design and production requirements) an apparatus 22 which produces geometric characteristics and commands 15 and 21 which are used (also subsequently) by several machine tools 19 or, on the contrary, several apparatus 22 (each for example used by a different user/design engineer) which produce the geometric characteristics and the commands 15 and 21 and which are then used by a single machine 19 to perform in sequence the machining of different gearwheels.

As a result of the system according to the invention, said system comprising a CAD-CAM machine assembly, with numerical modelling systems for contact and engagement between bodies, described by three-dimensional surfaces, it is possible to follow any future evolution in the geometric characteristics of gearwheels. In other words, as may now be easily understood by the person skilled in the art, in addition to involute gearwheels it is possible to construct wheels with cycloidal profiles or the like which hitherto has been restricted to truly special applications.

With the CAD-CAM machine system according to the invention it is possible to cut also wheels with internal teeth where, however, all the surfaces are concave (both the flank of the tooth and the bottom) and for which tools which are spherical or disc-shaped, but with curved sides, may be used, as can now be imagined by the person skilled in the art.

The assembly consisting of calculation module 11, module for processing the surfaces 16 and control module 18 may form overall a command production module for controlling a machine tool. This module, which is provided with an input (in the module 11) for receiving the parameters of the desired wheel (entered via the means 12), may be realized in the form of a program to be installed on a personal computer so as to form advantageously the apparatus 22 therewith.

The invention claimed is:

1. Method for machining a gearwheel by means of stock removal from a workpiece using a numerical-control machine tool with at least five machining axes, comprising steps of:

defining theoretical prefinishing surfaces and theoretical finishing surfaces for teeth of the gearwheel such that a theoretical finishing surface is underneath a theoretical prefinishing surface along parts of each tooth of the gearwheel at which material is removed during a finishing operation and such that the theoretical finishing surface is above the theoretical prefinishing surface along parts of each tooth of the gearwheel at which no material is removed during the finishing operation;

calculating a line of intersection between the theoretical prefinishing surface and the theoretical finishing surface for each tooth of the gearwheel;

using as real prefinishing surface for each tooth of the gearwheel the theoretical prefinishing surface and as real finishing surface for each tooth of the gearwheel a part less than an entirety of the theoretical finishing surface and situated between a tip of the tooth and the line of intersection; and performing for each tooth of the gearwheel a first gearwheel machining operation where tools follow first machining surfaces so as to form the real prefinishing surface and then performing a second gearwheel machining operation where tools follow second machining surfaces so as to form for each tooth the real finishing surface in the workpiece between the tip of the tooth and said line of intersection;

where the numerical-control machine uses internal routines to control the tools so as to move freely from one real machining surface to further real machining surface without the tools following the theoretical finishing surface between the one real machining surface to the further real machining surface whereby traveling time of the tools is minimized.

2. The method according to claim 1, wherein for each tooth of the gearwheel the theoretical prefinishing surface and the theoretical finishing surface are defined as surfaces theoretically generated respectively by a theoretical prefinishing hob and by a theoretical finishing hob.

3. The method according to claim 1, further comprising between the first and second gearwheel machining operations a step for heat treatment of the gearwheel.

4. The method according to claim 1, comprising checking, before performing the first and second gearwheel machining operations for each tooth of the gearwheel, that the intersection line is situated at a distance from an axis of the gearwheel, wherein said distance is smaller than an active radius of the gearwheel.

5. The method according to claim 1, further comprising a step for checking, before performing the first and second gearwheel machining operations for each tooth of the gearwheel, that the intersection line is contained within a volume defined by an active surface of revolution generated on basis of active diameters comprising a geometric locus of initial meshing contact points of the gearwheel.

6. The method according to claim 1, wherein the real finishing surface for each tooth of the gearwheel is formed by at least one first convex finishing surface part extending from the tip of the tooth up to an active diameter of the tooth and a second finishing surface part extending from the active diameter of the tooth to the line of intersection and having both concave and convex portions.

7. The method according to claim 6, wherein machining of the at least one first convex finishing surface part is formed by means of one of a conical or cylindrical milling cutter tool and wherein machining of the second convex finishing surface part is formed by means of one of a spherical or toroidal milling cutter.

8. The method according to claim 1, wherein the machine performs machining of the real prefinishing surface for each tooth of the gearwheel by means of a conical or cylindrical or disc-shaped milling cutter tool along a flank of the tooth and by means of a spherical or toroidal or disc-shaped milling cutter with a curved profile on a bottom of the tooth.

9. The method according to claim 1, wherein the line of intersection for each tooth of the gearwheel is expanded into a strip joining together the real prefinishing surface on a bottom of the tooth and the real finishing surface on a flank of the tooth.

10. The method according to claim 1, further comprising steps of calculating grid coordinates of measurement points of the real prefinishing and finishing surfaces for each tooth of the gearwheel to be machined and checking that the measurement points calculated on each tooth of the gearwheel being machined correspond, after the first gearwheel machining operation and before the second gearwheel machining operation, so as to center the machining operations on the teeth of the gearwheel to ensure uniformity of stock removed during the second gearwheel machining operation.

11. System for machining a gearwheel by means of stock removal from a workpiece, comprising:

a numerical-control machine tool with at least five machining axes;

means for entering parameters of a desired gearwheel;

a calculation module having a microprocessor device for calculating theoretical prefinishing surfaces and theoretical finishing surfaces for teeth of the gearwheel such that a theoretical finishing surface is underneath a theoretical prefinishing surface along parts of each tooth of the gearwheel at which material is removed during a finishing operation and such that the theoretical finishing surface is above the theoretical prefinishing surface along parts of each tooth of the gearwheel at which no material is removed during the finishing operation;

a processing module having a microprocessor device for calculating a line of intersection between the calculated theoretical prefinishing and theoretical finishing surfaces for each tooth of the gearwheel and defining at least one real finishing surface for each tooth of the gearwheel formed by a part less than an entirety of the theoretical prefinishing surface and situated between a tip of the tooth and the line of intersection; and a control module having a microprocessor device which receives geometric characteristics of the theoretical prefinishing surface for each tooth of the gearwheel as real prefinishing surface and geometric characteristics of the at least one real finishing surface for each tooth of the gearwheel and outputs commands to perform machining of the teeth of the gearwheel according to the real prefinishing surface and the at least one real finishing surface for each tooth of the gearwheel following first machining surfaces so as to form the real prefinishing surface and then following second machining surfaces so as to form for each tooth the real finishing surface in the workpiece between the tip of the tooth and said line of intersection;

where the numerical-control machine uses internal routines to control the tools so as to move freely from one real machining surface to further real machining surface without the tools following the theoretical finishing surface between the one real machining surface to the further real machining surface whereby traveling time of the tools is minimized.

12. The system according to claim 11, further comprising an interpolation and control module having a microprocessor device for directing the output commands to the machine.

13. The system according to claim 11, further comprising a rotatable table for carrying a workpiece to be machined to obtain a gearwheel, a gantry structure for motor-driven displacement along three Cartesian axes of a carriage which supports a motor-driven head which can be oriented about a first axis and inclined about an axis transverse to the first axis so as to form a five-axis positioning system, the motor-driven head carrying a chuck for tools for machining the real prefinishing surface and the at least one real finishing surface for each tooth of the gearwheel.

14. The system according to claim 13, further comprising a store for automatic tool change on the chuck.

15. The system according to claim 14, wherein the tools are provided in the store and comprise one or more of conical, cylindrical, and disc-shaped milling cutters and one or more of spherical and toroidal milling cutters.

16. The system according to claim 11, further comprising a rotatable table for carrying a workpiece to be machined to obtain a gearwheel, a gantry structure for motor-driven displacement along three Cartesian axes of a carriage which carries a head, the rotatable table being inclinable around a transverse motor-driven axis so as to form a five-axis positioning system, the head carrying a chuck for tools for machining the real prefinishing surface and the at least one real finishing surface for each tooth of the gearwheel.

17. The system according to claim 16, further comprising a store for automatic tool change on the chuck.

18. The system according to claim 17, wherein the tools are provided in the store and comprise one or more of conical cylindrical disc-shaped milling cutters and one or more of spherical and toroidal milling cutters.

19. The system according to claim 11, wherein the calculation module outputs coordinates of grids of measurement points, and further comprising means for measuring the grid measurement points for geometric verification of machining operations performed.

20. The system according to claim 11, wherein the microprocessor device for two or more of the calculation module, the processing module, and the control module is a single device for use with the two or more modules.

21. Apparatus for producing commands for machining a gearwheel by means of stock removal from a workpiece, which are intended for a numerical-control machine tool with at least five machining axes, comprising:
  means for entering parameters of a desired gearwheel;
  a calculation module having a microprocessor device for calculating theoretical prefinishing surfaces and theoretical finishing surfaces for teeth of the gearwheel such that a theoretical finishing surface is underneath a theoretical prefinishing surface along parts of each tooth of the gearwheel at which material is removed during a finishing operation and such that the theoretical finishing surface is above the theoretical prefinishing surface along parts of each tooth of the gearwheel at which no material is removed during the finishing operation;
  a processing module having a microprocessor device for calculating a line of intersection between the calculated theoretical prefinishing and theoretical finishing surfaces for each tooth of the gearwheel and defining at least one real finishing surface for each tooth of the gearwheel formed by a part less than an entirety of the theoretical prefinishing surface and situated between a tip of the tooth and the line of intersection; and
  a control module having a microprocessor device for receiving geometric characteristics of the theoretical prefinishing surface for each tooth of the gearwheel as real prefinishing surface and geometric characteristics of the at least one real finishing surface for each tooth of the gearwheel and for outputting commands to a machine which with tools of the machine follow operations for machining of the teeth of the gearwheel according to the real prefinishing surface and the at least one real finishing surface for each tooth of the gearwheel following first machining surfaces so as to form the real prefinishing surface and then following second machining surfaces so as to form for each tooth the real finishing surface in the workpiece between the tip of the tooth and said line of intersection;
  where the numerical-control machine uses internal routines to control the tools so as to move freely from one real machining surface to further real machining surface without the tools following the theoretical finishing surface between the one real machining surface to the further real machining surface whereby traveling time of the tools is minimized.

22. Module for producing commands for machining a gearwheel by means of stock removal from a workpiece, which are intended for a numerical-control machine tool with at least five machining axes, comprising:
  an input for entering parameters of a desired gearwheel;
  a calculation module having a microprocessor device for calculating theoretical prefinishing surfaces and theoretical finishing surfaces for teeth of the gearwheel such that a theoretical finishing surface is underneath a theoretical prefinishing surface along parts of each tooth of the gearwheel at which material is removed during a finishing operation and such that the theoretical finishing surface is above the theoretical prefinishing surface along parts of each tooth of the gearwheel at which no material is removed during the finishing operation;
  a processing module having a microprocessor device for calculating a line of intersection between the calculated theoretical prefinishing and theoretical finishing surfaces for each tooth of the gearwheel and defining at least one real finishing surface for each tooth of the gearwheel formed by a part less than an entirety of the theoretical prefinishing surface and situated between a tip of the tooth and the line of intersection; and
  a control module having a microprocessor device for receiving geometric characteristics of the theoretical prefinishing surface for each tooth of the gearwheel as real prefinishing surface and geometric characteristics of the at least one real finishing surface for each tooth of the gearwheel and for outputting commands to a machine for machining of the gearwheel according to the real prefinishing surface and the at least one real finishing surface for each tooth of the gearwheel following first machining surfaces so as to form the real prefinishing surface and then following second machining surfaces so as to form for each tooth the real finishing surface in the workpiece between the tip of the tooth and said line of intersection;
  where the numerical-control machine uses internal routines to control the tools so as to move freely from one real machining surface to further real machining surface without the tools following the theoretical finishing surface between the one real machining surface to the further real machining surface whereby traveling time of the tools is minimized.

\* \* \* \* \*